US011178962B2

(12) United States Patent
Koehn et al.

(10) Patent No.: US 11,178,962 B2
(45) Date of Patent: Nov. 23, 2021

(54) POWER-DRIVEN TABLE STAND WITH COMBINING MECHANOTRONICS

(71) Applicants: TIMOTION TECHNOLOGY CO., LTD., New Taipei (TW); ADJUSTME sourcing ApS, Copenhagen (DK)

(72) Inventors: John Aage Koehn, Copenhagen (DK); Yu-Chang Lin, New Taipei (TW)

(73) Assignees: TIMOTION TECHNOLOGY CO., LTD., New Taipei (TW); ADJUSTME SOURCING APS, Copenhagen (DK)

( * ) Notice: Subject to any disclaimer, the term of this patent is extended or adjusted under 35 U.S.C. 154(b) by 0 days.

(21) Appl. No.: 15/931,387

(22) Filed: May 13, 2020

(65) Prior Publication Data

US 2020/0359783 A1    Nov. 19, 2020

Related U.S. Application Data

(60) Provisional application No. 62/848,563, filed on May 15, 2019.

(51) Int. Cl.
| | | |
|---|---|---|
| *A47B 9/20* | (2006.01) | |
| *H02K 5/22* | (2006.01) | |
| *A47B 13/02* | (2006.01) | |
| *A47B 21/02* | (2006.01) | |
| *A47B 17/02* | (2006.01) | |

(52) U.S. Cl.
CPC ............ *A47B 9/20* (2013.01); *A47B 13/02* (2013.01); *H02K 5/225* (2013.01); *A47B 17/02* (2013.01); *A47B 21/02* (2013.01); *A47B 2200/002* (2013.01); *A47B 2200/0052* (2013.01)

(58) Field of Classification Search
CPC combination set(s) only.
See application file for complete search history.

(56) References Cited

U.S. PATENT DOCUMENTS

| | | | |
|---|---|---|---|
| 4,966,341 A * | 10/1990 | Borsani | A47B 13/06 248/165 |
| 9,427,080 B2 * | 8/2016 | Wu | A47B 9/00 |

(Continued)

FOREIGN PATENT DOCUMENTS

| | | |
|---|---|---|
| DE | 202012009673 U1 | 11/2012 |
| TW | M486995 U | 10/2014 |
| TW | M601047 U | 9/2020 |

OTHER PUBLICATIONS

Search Report dated Feb. 16, 2021 of the corresponding Denmark patent application No. PA202070313.

*Primary Examiner* — Monica E Millner
(74) *Attorney, Agent, or Firm* — Chun-Ming Shih; HDLS IPR Services

(57) ABSTRACT

A power-driven table stand with combining mechanotronics includes: a horizontal bar structure (10); a pair of supporters (20), connected at two sides of the horizontal bar structure (10); a pair of vertical post structures (30), connected to each of the supporters (20) and having a motor (31); and an electrical device (40), having a controller (41) and a guide wiring (45), wherein the controller (40) is disposed on the horizontal bar structure (10), the guide wiring (45) is stored and hidden in the horizontal bar structure (10) and each of the supporters (20), and electrically connected to the controller (41) and the motor (31). Accordingly, power wires and signal wires can be effectively and properly stored and hidden.

23 Claims, 18 Drawing Sheets

(56) References Cited

U.S. PATENT DOCUMENTS

| | | | | |
|---|---|---|---|---|
| 9,730,512 B1* | 8/2017 | Bruder | ............... | A47B 9/04 |
| 9,848,696 B2* | 12/2017 | Tseng | ............... | A47B 9/04 |
| 9,993,068 B2* | 6/2018 | Lin | ............... | A47B 9/00 |
| 10,349,736 B2* | 7/2019 | Tseng | ............... | A47B 9/04 |
| 10,455,932 B2* | 10/2019 | Lin | ............... | A47B 9/00 |
| 2009/0078171 A1* | 3/2009 | Frost | ............... | A47B 13/00 |
| | | | | 108/50.02 |
| 2011/0215207 A1* | 9/2011 | Koder | ............... | H02K 11/35 |
| | | | | 248/157 |
| 2012/0126072 A1* | 5/2012 | Pettersson | ............... | A47B 9/04 |
| | | | | 248/157 |
| 2014/0367538 A1* | 12/2014 | Widholzer | ............... | A47B 9/20 |
| | | | | 248/188.1 |
| 2016/0106205 A1* | 4/2016 | Hall | ............... | A47B 21/02 |
| | | | | 700/275 |
| 2016/0128467 A1* | 5/2016 | Sigal | ............... | H04W 4/80 |
| | | | | 700/275 |
| 2017/0224101 A1* | 8/2017 | Bruder | ............... | A47B 13/06 |
| 2017/0251802 A1* | 9/2017 | Lu | ............... | A47B 3/06 |
| 2018/0338608 A1* | 11/2018 | Keller | ............... | A47B 9/20 |
| 2018/0368569 A1* | 12/2018 | Laing | ............... | A47C 19/024 |
| 2020/0359784 A1* | 11/2020 | Koehn | ............... | A47B 13/06 |

* cited by examiner

POWER-DRIVEN TABLE STAND WITH COMBINING MECHANOTRONICS

BACKGROUND OF THE INVENTION

Field of the Invention

The present invention relates to a technical field of a power-driven table stand, especially to a power-driven table stand with combining mechanotronics.

Description of Related Art

For satisfying different body types, such as heights and weights, and various habits of consumers, a conventional fixed type table has be gradually replaced by a power-driven lifting table capable of adjusting the height, thus the power-driven lifting table has been the trend for the designers and consumers; moreover, after the height of the power-driven lifting table is adjusted to a proper height, objects of allowing a user to feel comfortable and matching the height of the user can be achieved.

In the conventional power-driven lifting tables, there are some power-driven lifting tables utilize a motor working with retractable pipes as stands, and a controller is electrically connected to a motor for a purpose of controlling, so that a wiring design of connection wires used for transferring power and/or signal is very important; however, in the conventional products, there are some products that may have a problem of having the connection wires being exposed, or having the connection wires being twisted with each other, and the above-mentioned problem not only causes a safety issue, but also affect the whole appearance.

Moreover, in an assembling process of the conventional power-driven lifting table, there are a lot of screws required for locking and assembling, thus the assembling process is complicated and requires tremendous amount of labor and time cost; if an inexperienced operator performs the assembling process, situations such as errors and variations, may be happened. Furthermore, for maintaining the stability of the conventional power-driven lifting table, a lot of metal components are required, so that the whole volume would become large, and the weight would become heavy, thereby causing inconveniences in transportation and the cost of transportation is inevitably increased.

Accordingly, the applicant of the present invention has devoted himself for improving the mentioned disadvantages.

SUMMARY OF THE INVENTION

The present invention is to provide a power-driven table stand with combining mechanotronics, in which a novel wiring design of connection wires is provided, so that power wires and signal wires are able to be properly stored and hidden.

Accordingly, the present invention provides a power-driven table stand with combining mechanotronics including a horizontal bar structure, a pair of supporters, a pair of vertical post structures and an electrical device; each of the supporters is connected at two sides of the horizontal bar structure; each of the vertical post structures is connected to each of the supporters, and the vertical post structure has a motor; the electrical device has a controller and a guide wiring, the controller is disposed on the horizontal bar structure, and the guide wiring is stored and hidden in the horizontal bar structure and each of the supporters, and electrically connected to the controller and the motor.

Advantages achieved by the present invention are as follows. A top shell cover and a bottom shell cover of a middle bar segment and a top shell cover and a bottom shell cover of each side bar segments are made of a plastic insulation material, so that the weight can be greatly reduced, and an excellent insulating effect is provided. With an arrangement of the horizontal bar structure being assembled with a sliding manner, the assembly process can be simplified and the labor cost can be saved, and situation of errors and variations can be avoided. With a sleeve pipe being provided to cover an outer side of each of the side bar segments, electrical components disposed therein can be prevented from being damaged due to moisture. With a first guiding module and a third guiding module being moveably disposed with each of the side bar segments, the width of each of the vertical post structures can be adjusted by a user.

DETAILED DESCRIPTION OF THE INVENTION

Preferred embodiments of the present invention will be described with reference to the drawings.

Figure 1:
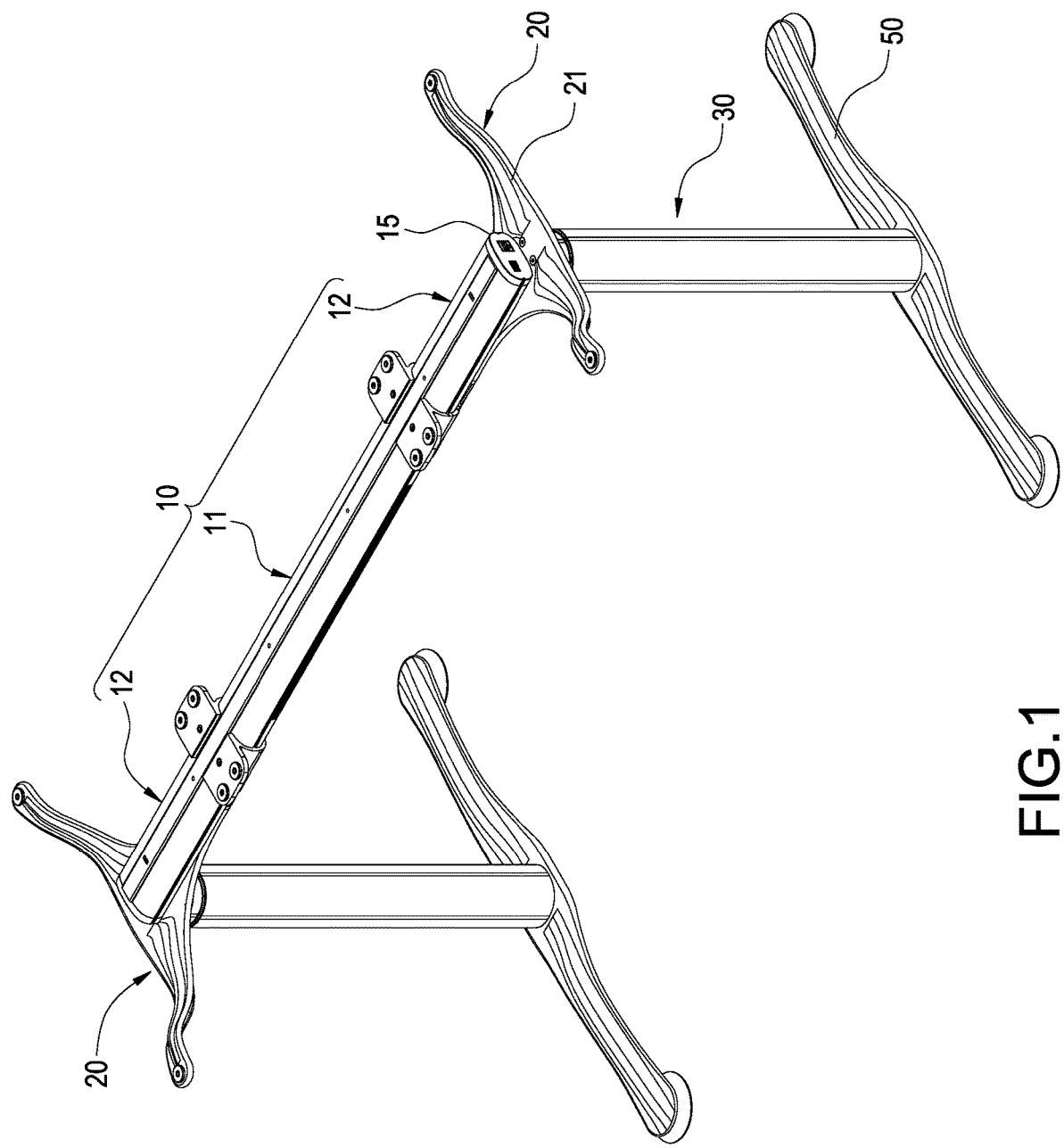
FIG. 1 is a schematic view showing the assembly of the power-driven table stand with combining mechanotronics according to the present invention.
Figure 2:
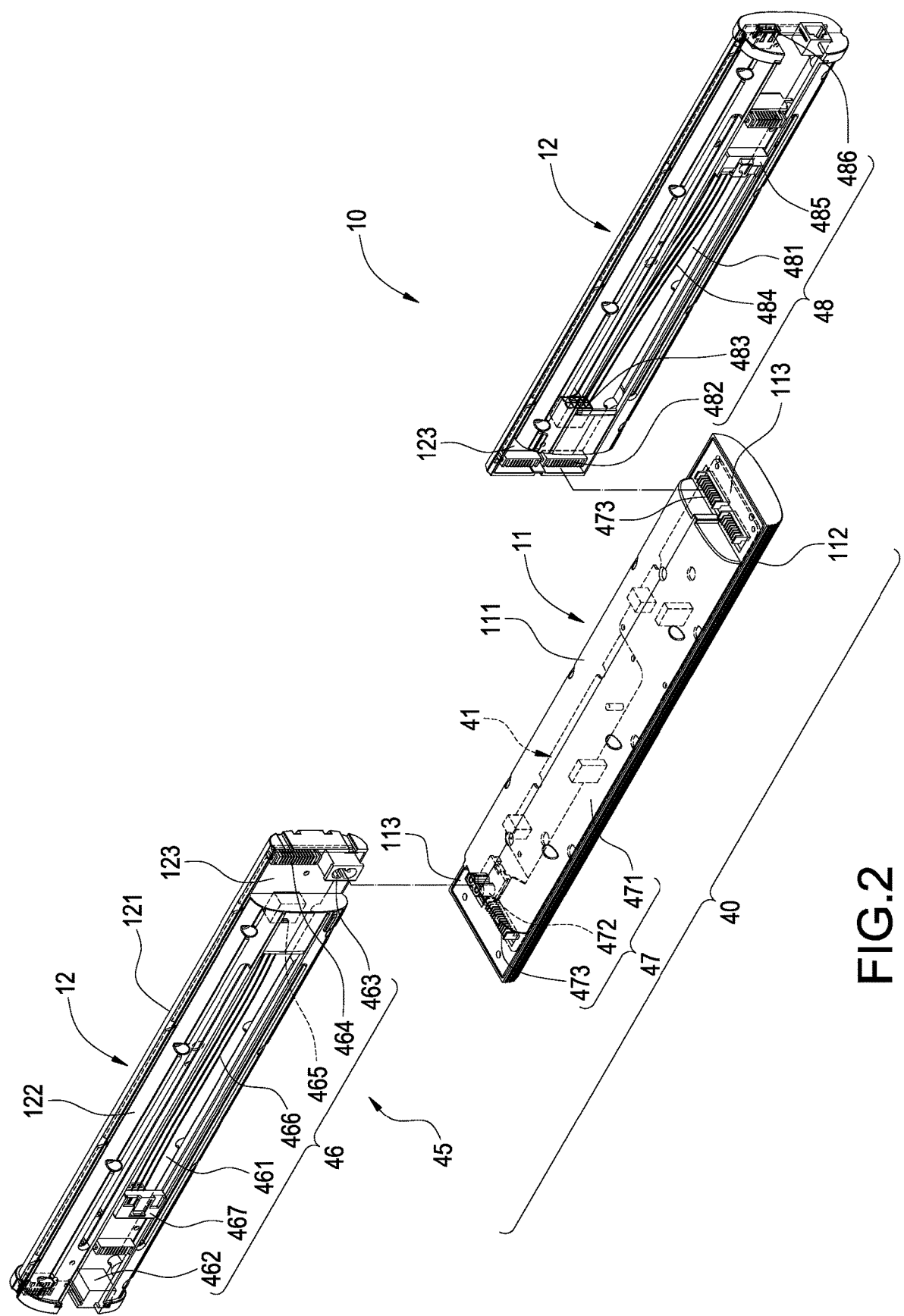
FIG. 2 is an exploded view showing the horizontal bar structure and the electrical device according to the present invention.
Figure 3:
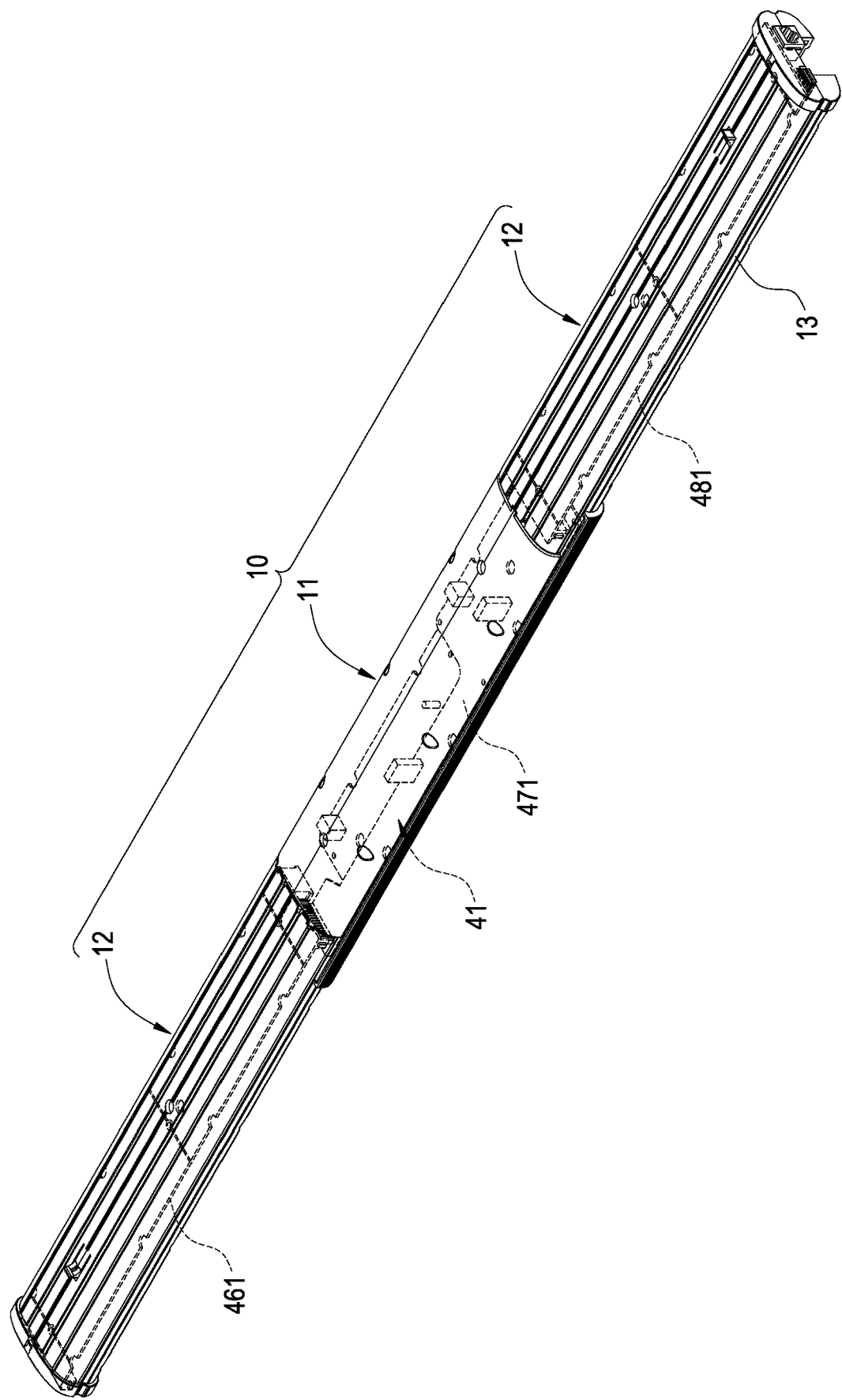
FIG. 3 is a schematic view showing the assembly of the horizontal bar structure and the electrical device according to the present invention.
Figure 4:
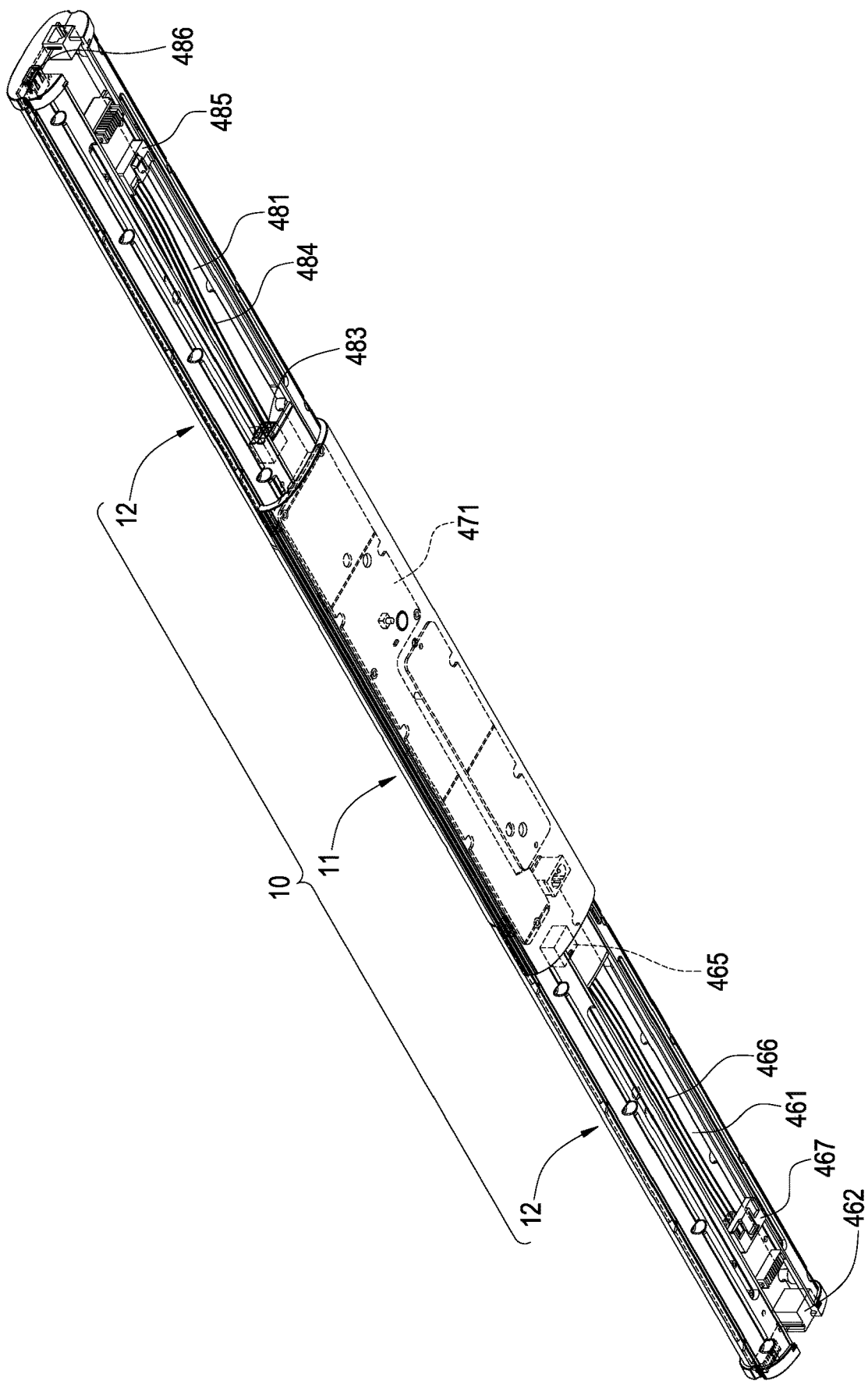
FIG. 4 is another schematic view showing the assembly of the horizontal bar structure and the electrical device according to the present invention.
Figure 5:
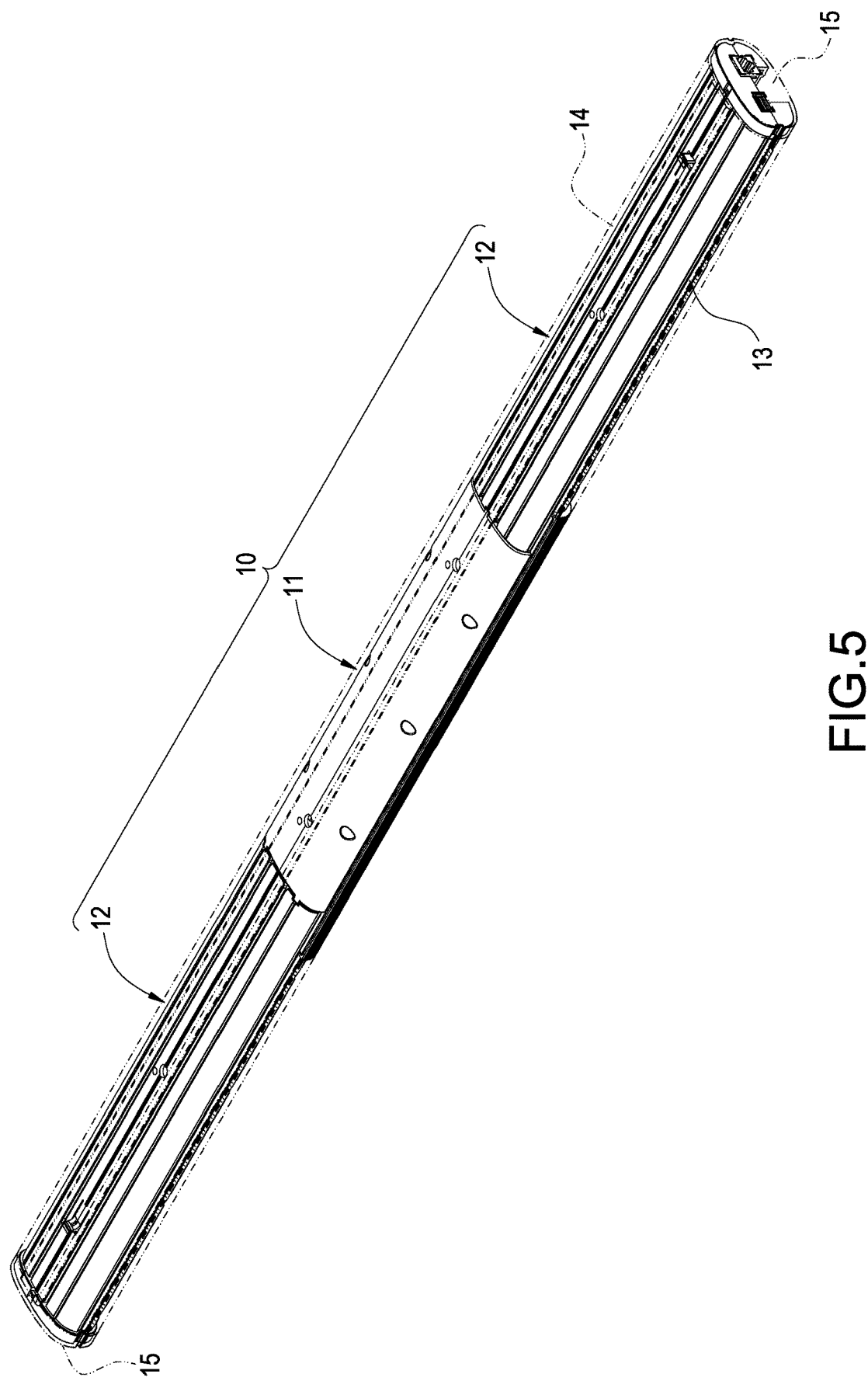
FIG. 5 is a schematic view showing the horizontal bar structure and the electrical device being assembled then sleeved with the sleeve pipe according to the present invention.

Please refer to FIG. 1. The present invention provides a power-driven table stand with combining mechanotronics, which includes a horizontal bar structure 10, a pair of supporters 20, a pair of vertical post structures 30, an electrical device 40 (as shown in FIG. 2) and a pair of bases 50, and each of the bases 50 is connected to one end, defined being away from the supporter 20, of each of the vertical post structures 30.

Please refer from FIG. 2 to FIG. 5. The horizontal bar structure 10 mainly has a middle bar segment 11 and two side bar segments 12, the middle bar segment 11 can be made of an insulation material, for example a plastic material, and the middle bar segment 11 has a top shell cover 111 and a bottom shell cover 112 mutually assembled with the top shell cover 111, and a cross section of the assembly of the top shell cover 111 and the bottom shell cover 112 is substantially formed in an oval-like shape, and two ends of the middle bar segment 11 respectively have a combining part 113. Each of the side bar segments 12 can also be made of an insulation material, for example a plastic material, and mainly has a top shell cover 121 and a bottom shell cover 122 mutually assembled with the top shell cover 121, and a cross section of the assembly of the top shell cover 121 and the bottom shell cover 122 is substantially formed in an oval-like shape, one end of each of the side bar segments 12 has a combining part 123, so that the horizontal bar structure 10 is assembled through the combining part 123 of each of the side bar segments 12 being combined with the combining part 113 of the middle bar segment 11.

Moreover, the horizontal bar structure 10 further has a pair of guide slots 13 formed at a central location defined at a lateral side of the middle bar segment 11 and that of each of the side bar segments 12 and corresponding to each other.

Moreover, the horizontal bar structure 10 further has a sleeve pipe 14 sleeved at an outer side of the middle bar segment 11 and that of each of the side bar segments 12.

Furthermore, the horizontal bar structure 10 further has a pair of end covers 15, each of the end covers 15 covers at one end, defined being away from the combining part 113, of each of the side bar segments 12 and mutually sleeved with the sleeve pipe 14.

The electrical device 40 mainly has a controller 41 and a guide wiring 45. The controller 41 is disposed in the middle bar segment 11 and mainly used for rectifying, filtering and lowering voltage. The guide wiring 45 mainly has a first guiding module 46, a second guiding module 47 and a third guiding module 48.

The first guiding module 46 is disposed at the side bar segment 12 arranged at the left side, and mainly has a circuit board 461, a power input electrical terminal 462, a power output electrical terminal 463, a power and single input connection port 464, a power and signal output connection port 465, a plurality of connection wires 466 and a power and signal input/output electrical terminal 467, wherein the circuit board 461 is fastened in an internal space defined by the top shell cover 121 and the bottom shell cover 122, the power input electrical terminal 462, the power output electrical terminal 463, the power and signal input connection port 464 and the power and signal output connection port 465 are fastened on the circuit board 461, and an electrical connecting status is established via a copper foil circuit disposed on the circuit board 461.

Wherein, the power input electrical terminal 462 is located at one end, defined being away from the middle bar segment 11, of the side bar segment 12, the power output electrical terminal 463 and the power and signal input connection port 464 are located at a location where the combining part 123 of the side bar segment 12 is disposed, the power and signal input/output electrical terminal 465 is located close to the end wherein the power input electrical terminal 463 is disposed, and the power and signal input/output electrical terminal 467 is moveably disposed on the bottom shell cover 122, and connected to the power and signal output connection port 465 via each of the connection wires 466.

The second guiding module 47 is disposed at the middle bar segment 11, and mainly has a circuit board 471, a power input electrical terminal 472, two power and signal output connection ports 473; wherein the circuit board 471 and the controller 41 are fastened in an internal space defined by the top shell cover 111 and the bottom shell cover 112, the power input electrical terminal 472 and each of the power and signal output connection ports 473 are fastened on the circuit board 471, and an electrical connecting status is established via a copper foil circuit disposed on the circuit board 471.

Wherein, the power input electrical terminal 472 and one of the power and signal output connection ports 473 are disposed at the combining part 113 arranged at the left side of the middle bar segment 11, and the other power and signal output connection port 473 is disposed at the other combining part 113 arranged at the right side of the middle bar segment 11; wherein, the power input electrical terminal 472 and the power output electrical terminal 463 are inserted for being connected, and one of the power and signal output connection ports 473 and the power and signal input connection port 464 are inserted for being connected.

The third guiding module 48 is disposed at the side bar segment 12 arranged at the right side, and mainly has a circuit board 481, a power and single input connection port 482, a power and signal output connection port 483, a plurality of connection wires 484, a power and signal input/output electrical terminal 485, and a plurality of functional connection ports 486, wherein the circuit board 481 is fastened in the internal space defined by the top shell cover 121 and the bottom shell cover 122, the power and signal input connection port 482, the power and signal output connection port 483 and each of the functional connection ports 486 are fastened on the circuit board 481, and an electrical connecting status is established via a copper foil circuit disposed on the circuit board 481.

Wherein, the power and signal input connection port 482 is located at a location where the combining part 123 of the side bar segment 12 is disposed, the power and signal output connection port 483 is located close to the end wherein the power and signal input connection port 482 is disposed, and the power and signal input/output electrical terminal 485 is moveably disposed on the bottom shell cover 122, and connected to the power and signal output connection port 483 via each of the connection wires 484.

Wherein, the power and signal input connection port 482 and the other power and signal input connection port 473 are inserted for being connected. The functional connection ports 486 are used for allowing different electronic devices having different functions, for example charging, storing electricity or a power source to be inserted for being connected.

Figure 6:
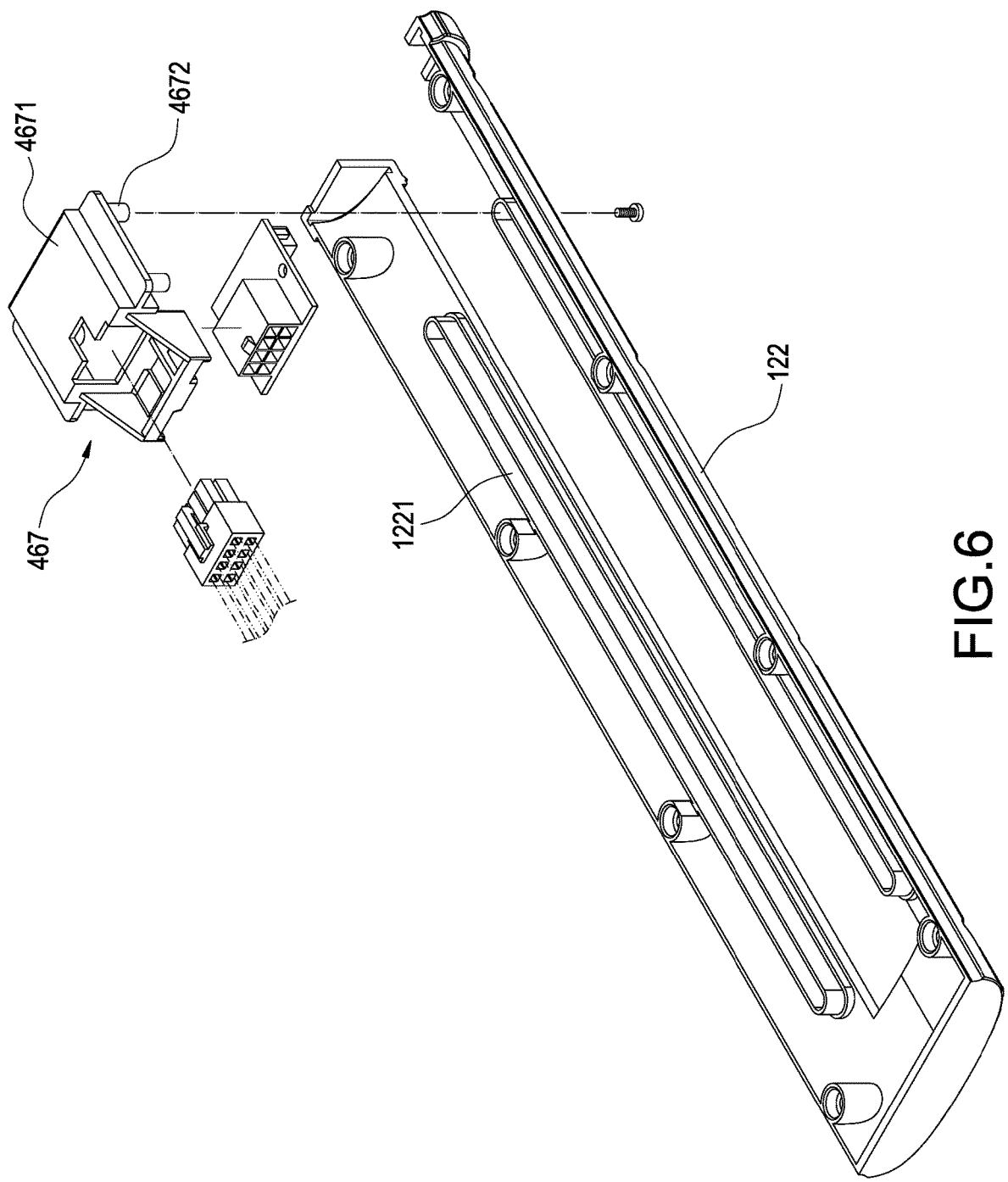
FIG. 6 is an exploded view showing the bottom shell cover of the side bar segment and the power and signal input/output electrical terminal according to the present invention.
Figure 7:
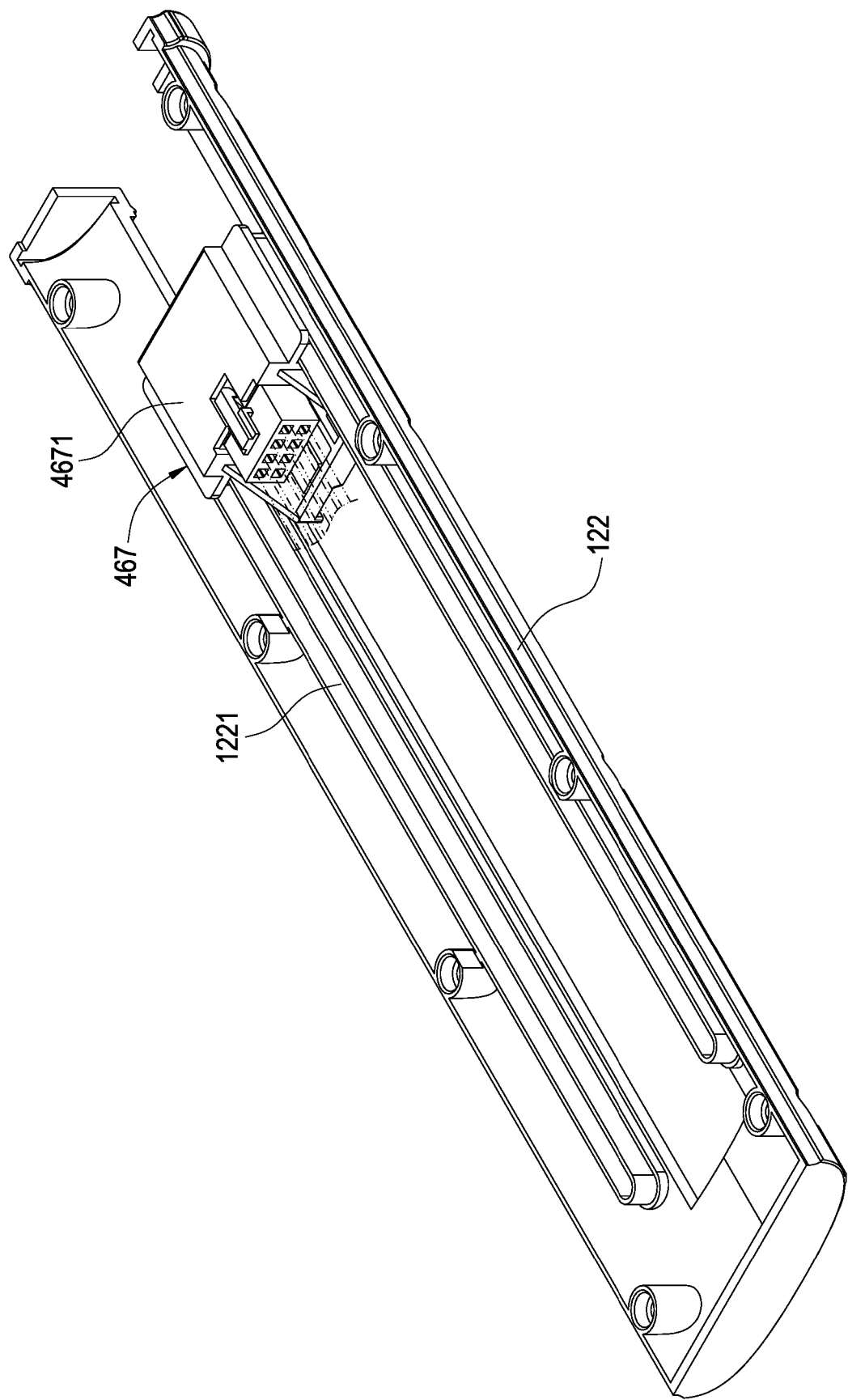
FIG. 7 is a schematic view showing the assembly of FIG. 6.
Figure 8:
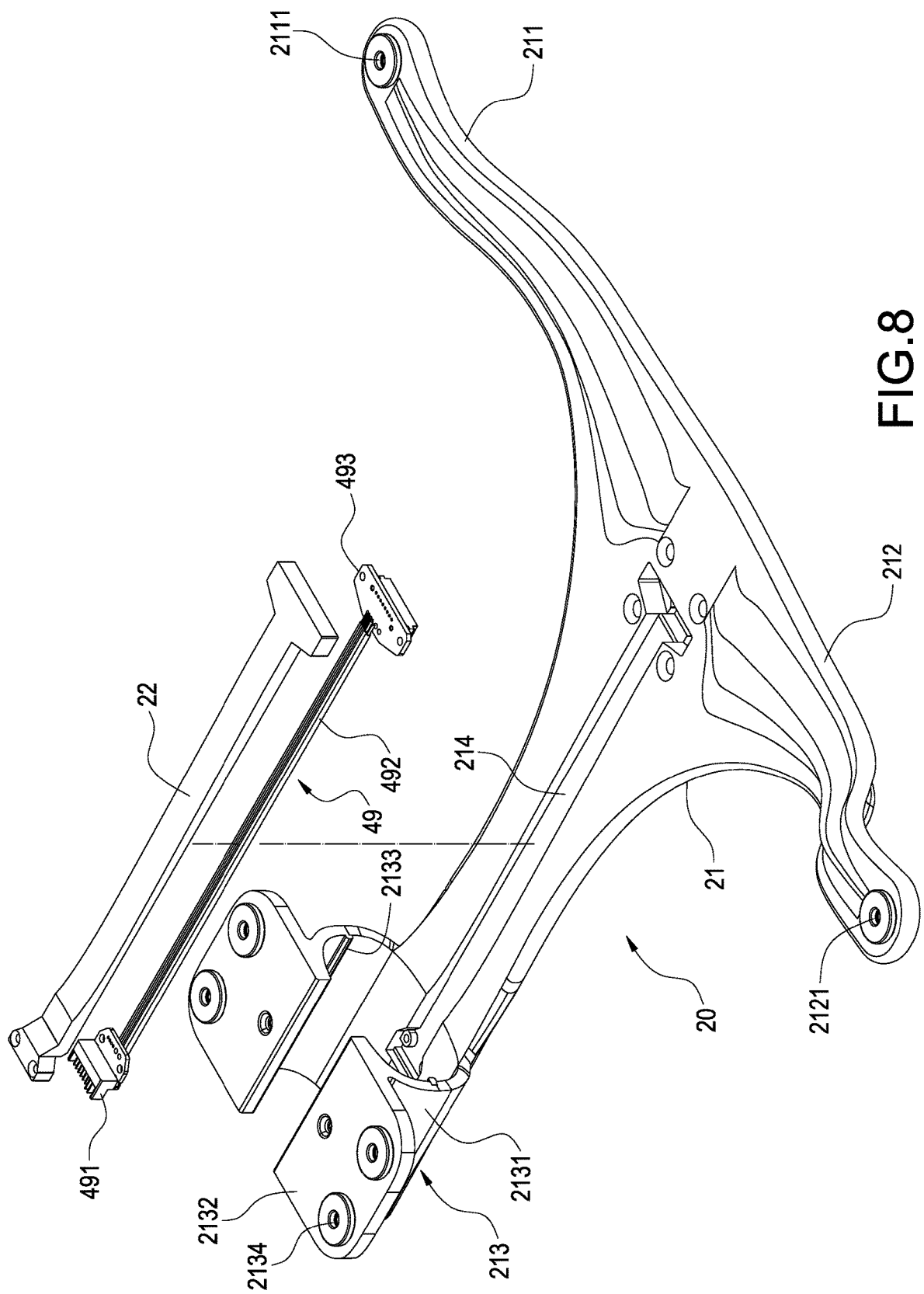
FIG. 8 is an exploded view showing the supporter and a part of the connection wires according to the present invention.
Figure 9:
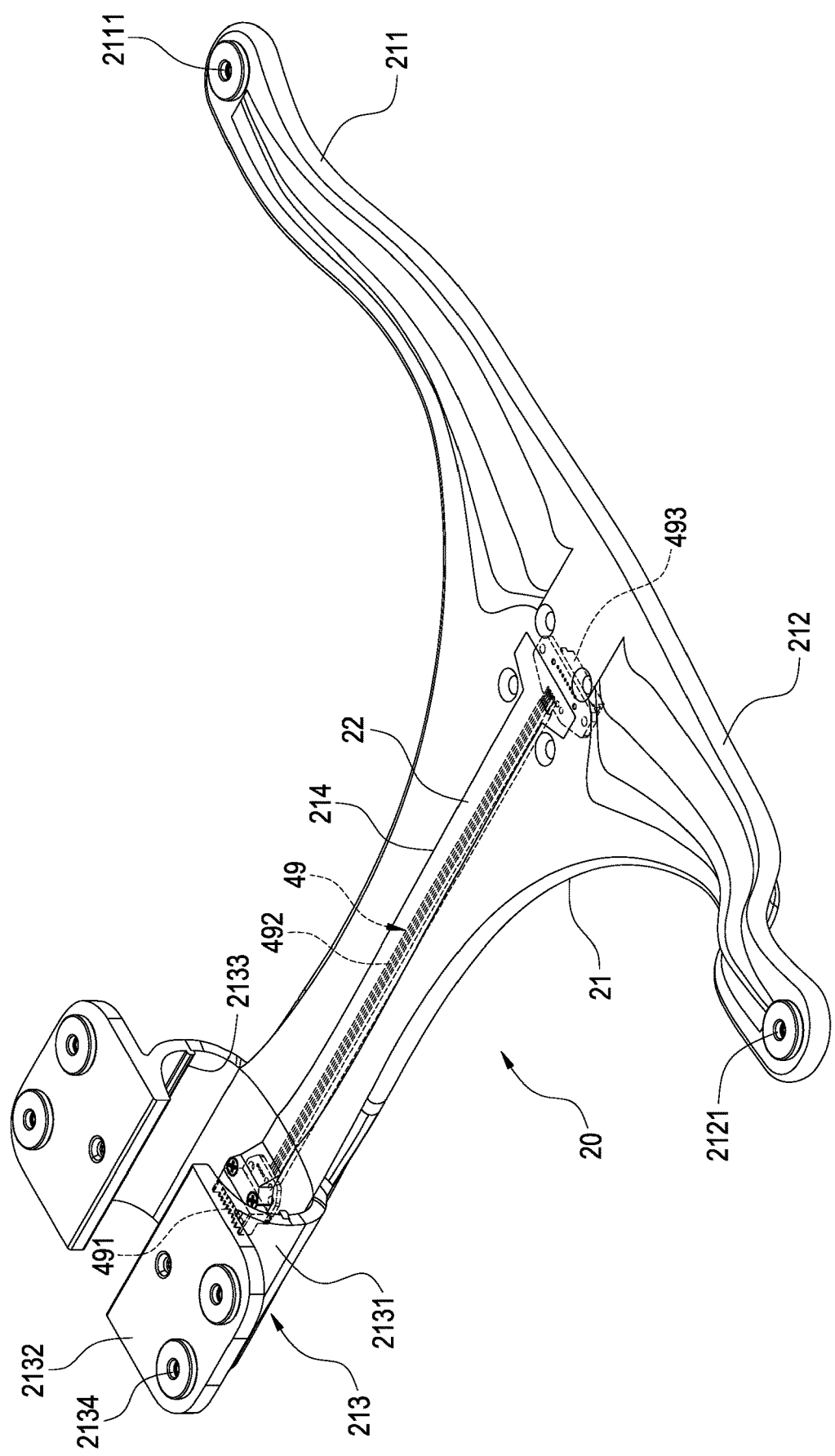
FIG. 9 is a schematic view showing the assembly of FIG. 8.
Figure 10:
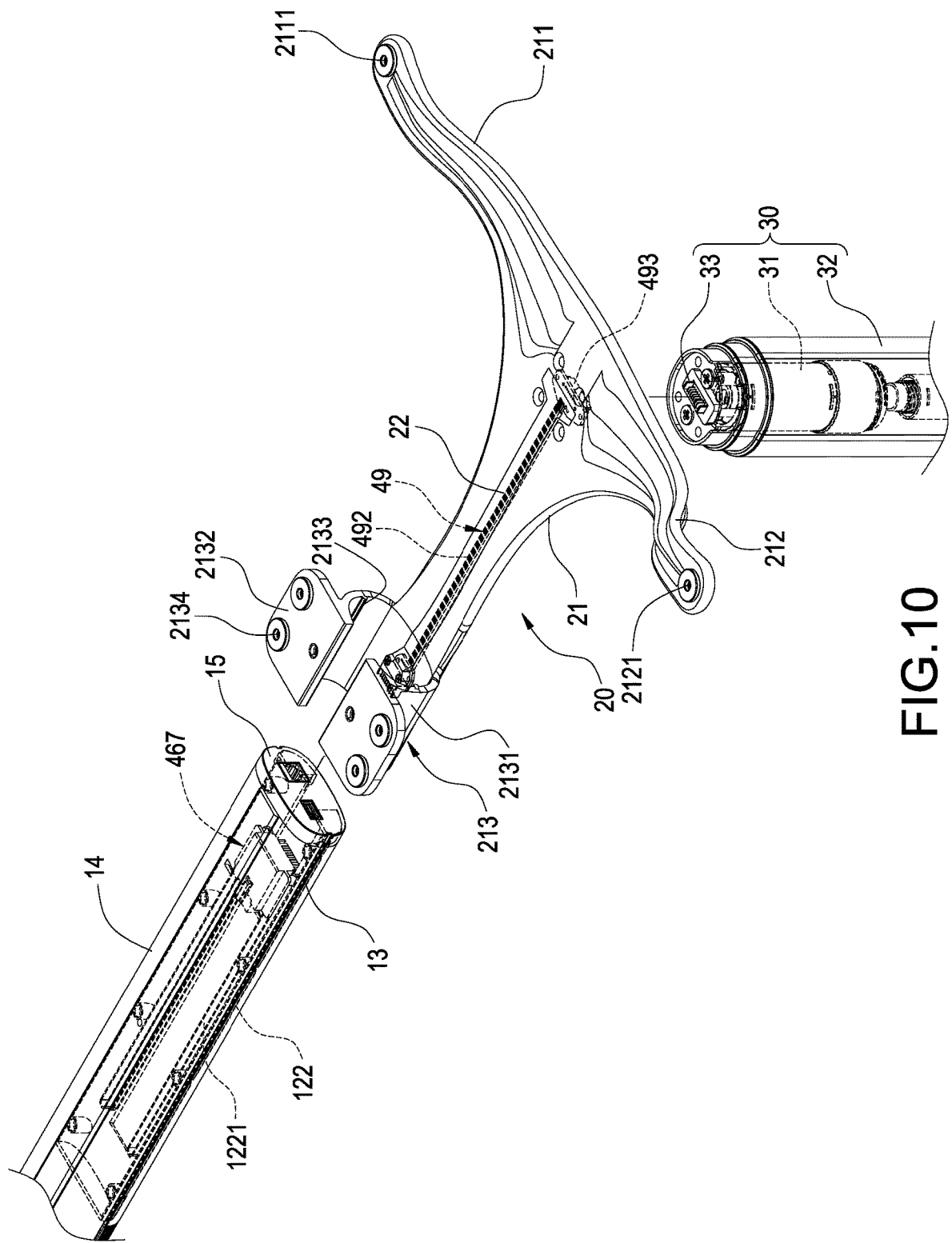
FIG. 10 is an exploded view showing a part of the horizontal bar structure, the supporter and the vertical post structure according to the present invention.
Figure 11:
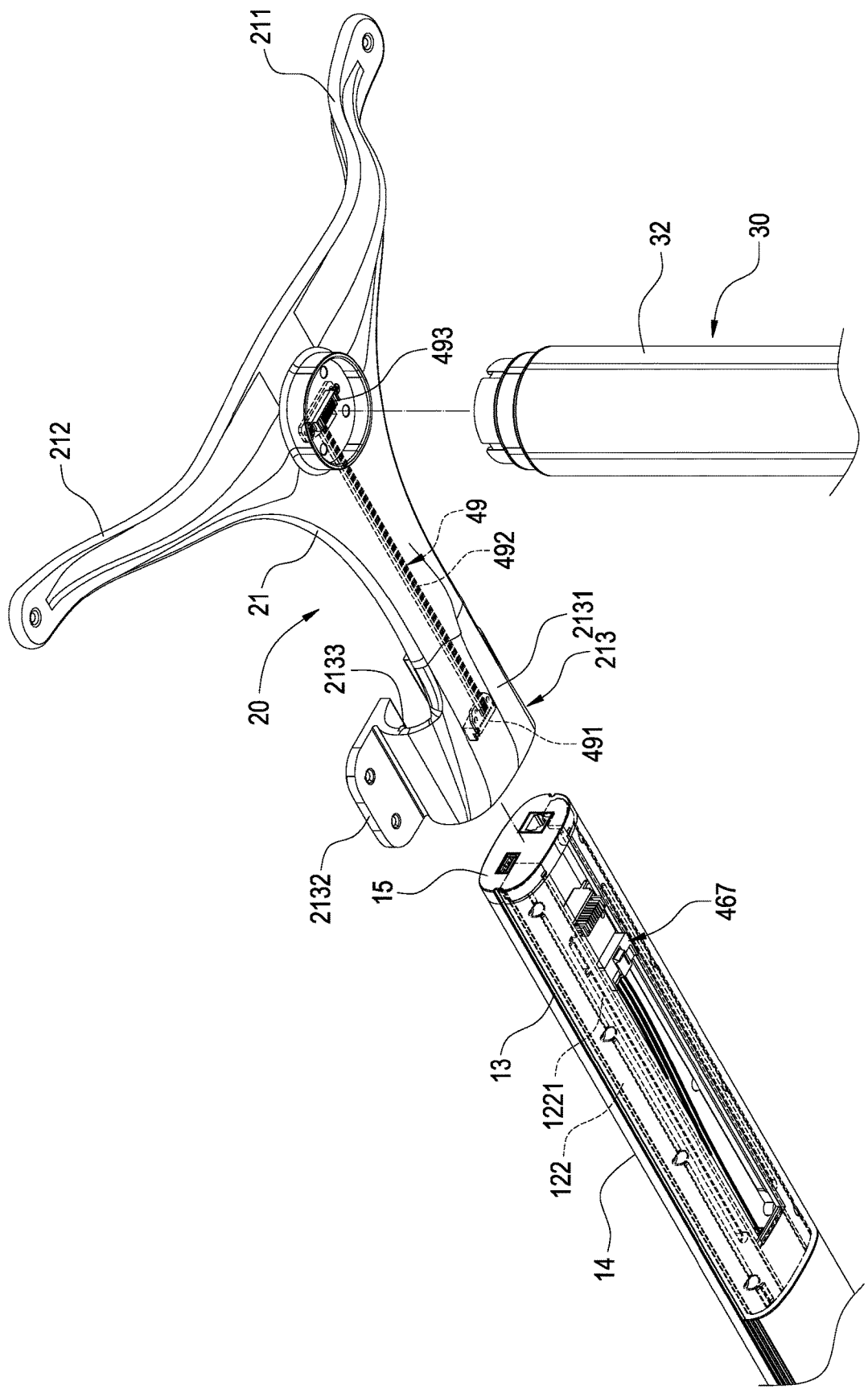
FIG. 11 is another exploded view showing a part of the horizontal bar structure, the supporter and the vertical post structure according to the present invention.
Figure 12:
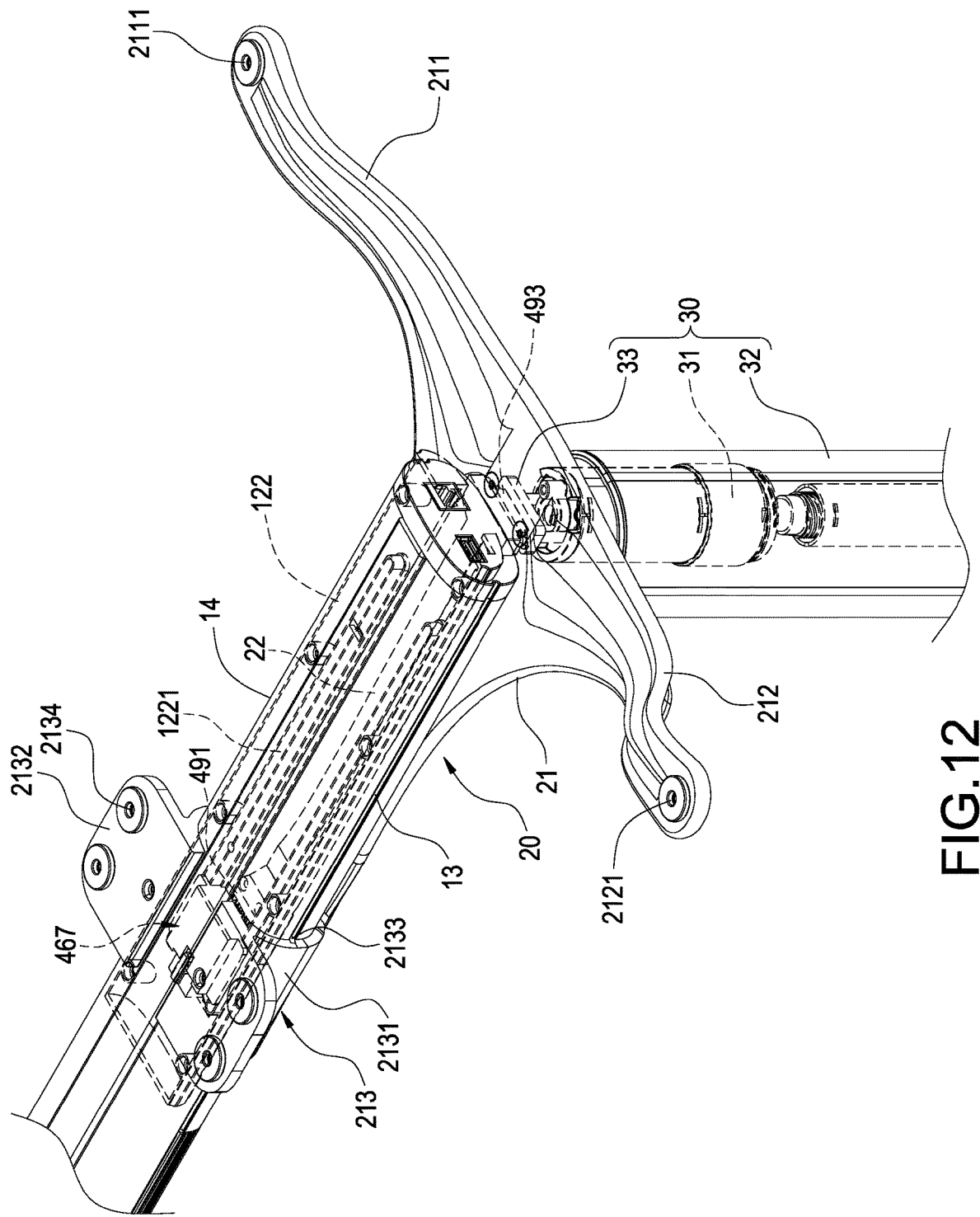
FIG. 12 is a schematic view showing the assembly of a part of the horizontal bar structure, the supporter and the vertical post structure according to the present invention.

Please refer from FIG. 6 and FIG. 7. A set of guiding grooves 1221 are formed in the bottom shell cover 122 of the side bar segment 12, a sliding seat 4671 is disposed at the power and signal input/output electrical terminal 467, and a plurality of convex columns 4672 are extended from the sliding seat 4671, each of the convex columns 4672 passes the guiding grooves 1221, so that the power and signal input/output electrical terminal 467 is able to displace relative to the bottom shell cover 122. With the same arrangement, a sliding seat (not shown in figures) is disposed at the power and signal input/output electrical terminal 485, so that the power and signal input/output electrical terminal 485 is able to displace relative to the bottom shell cover 122.

Please refer from FIG. 8 to FIG. 12. The guide wiring 45 further has a fourth guiding module 49 mainly having a power and signal input connection port 491, a plurality of connection wires 492 and a power and signal output connection port 493, and the power and signal input connection port 491 and the power and signal output connection port 493 are electrically connected via each of the connection wires 492; wherein the power and signal input connection port 491 and the power and signal input/output electrical terminal 467 or the power and signal input/output electrical terminal 485 are inserted for being connected.

The supporters 20 are connected at two sides of the horizontal bar structure 10 and mainly has a base seat 21; according to this embodiment, the base seat 21 is in a T-like shape, but what shall be addressed is that the scope of the present invention is not limited to the above-mentioned T-like shape, the base seat 21 can be formed through an aluminum alloy being processed with a punching or extruding operation, each distal end of the base seat 21 is upwardly extended with a first arm member 211, a second arm member 212 and a third arm member 213, a wire receiving slot 214 is formed at a central location of the base seat 21, the wire receiving slot 214 allows the fourth guiding module 49 to be received, and a press plate 22 is utilized for pressing and fastening.

Moreover, a penetrated hole 2111, 2121 is respectively formed at a distal location of the first arm member 211 and that of the second arm member 212. The third arm member 213 mainly has a supporting element 2131 and a fastening plate 2132 extending from an opening of the supporting element 2131 towards a horizontal direction; according to this embodiment, the supporting element 2131 is formed in a C-like shape, what shall be addressed is that the scope of the present invention is not limited to the above-mentioned C-like shape, a pair of convex strips 2133 are protruded from an inner wall surface of the supporting element 2131, and each of the convex strips 2133 is correspondingly mounted in each of the guiding slots 13 of the horizontal bar structure 10. Moreover, a penetrated hole 2134 is formed in each of the fastening plates 2132.

Each of the vertical post structures 30 is connected to each of the supporters 20 and mainly has a motor 31 and a plurality of retractable pipes 32. The motor 31 is disposed in the retractable pipe 32 and used for driving each of the retractable pipes 32 to retractably move. The motor 31 is inserted for being connected to the power and signal output connection port 493 via an electrical terminal 33, and the electrical terminal 33 is fastened on a top end surface of the retractable pipe 32, so that the vertical post structures 30 and the supporters 20 can be assembled and can be electrically connected in a simultaneous manner.

Figure 13:
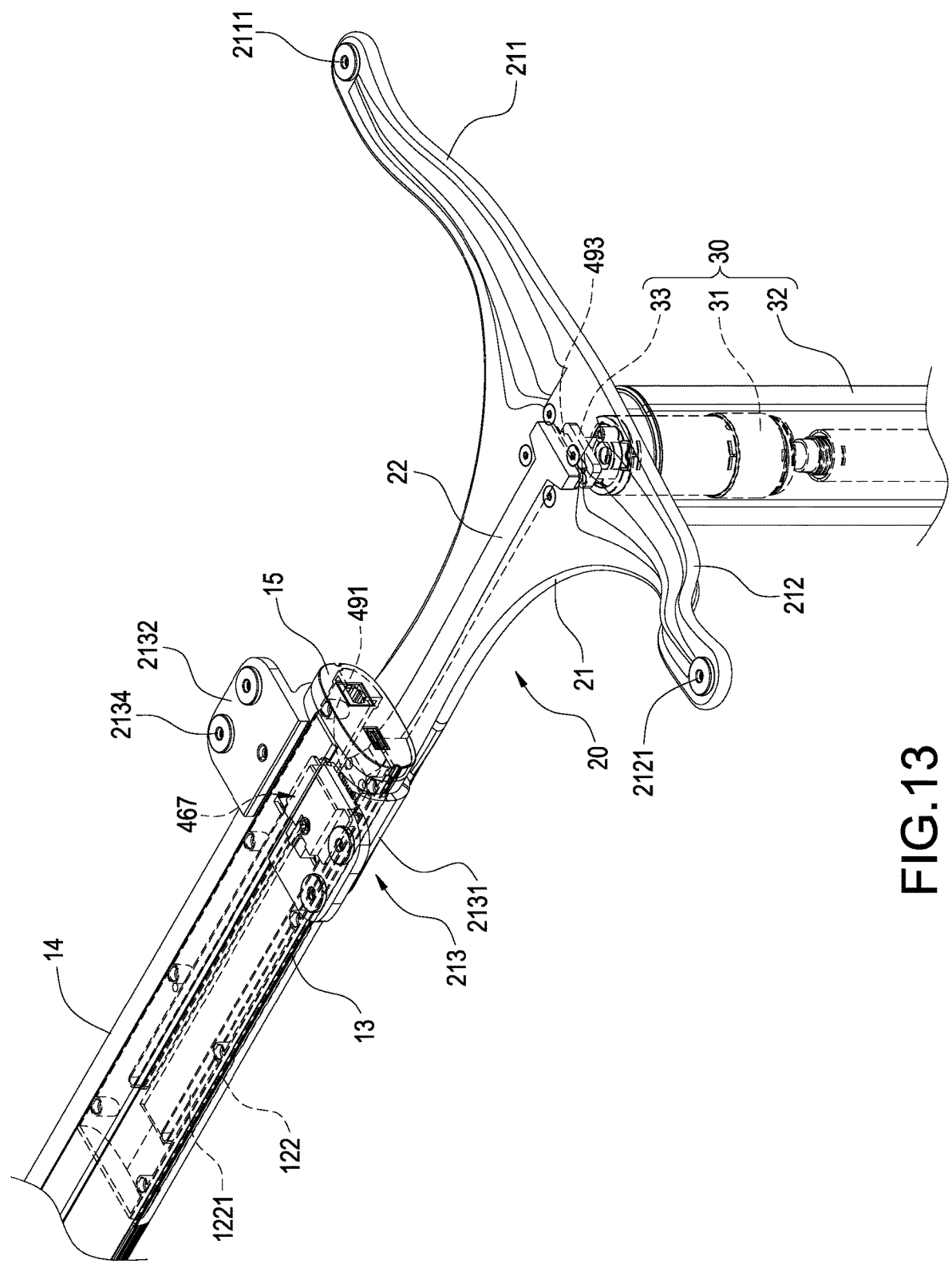
FIG. 13 is a schematic view showing an operating status of a part of the horizontal bar structure, the supporter and the vertical post structure according to the present invention.
Figure 14:
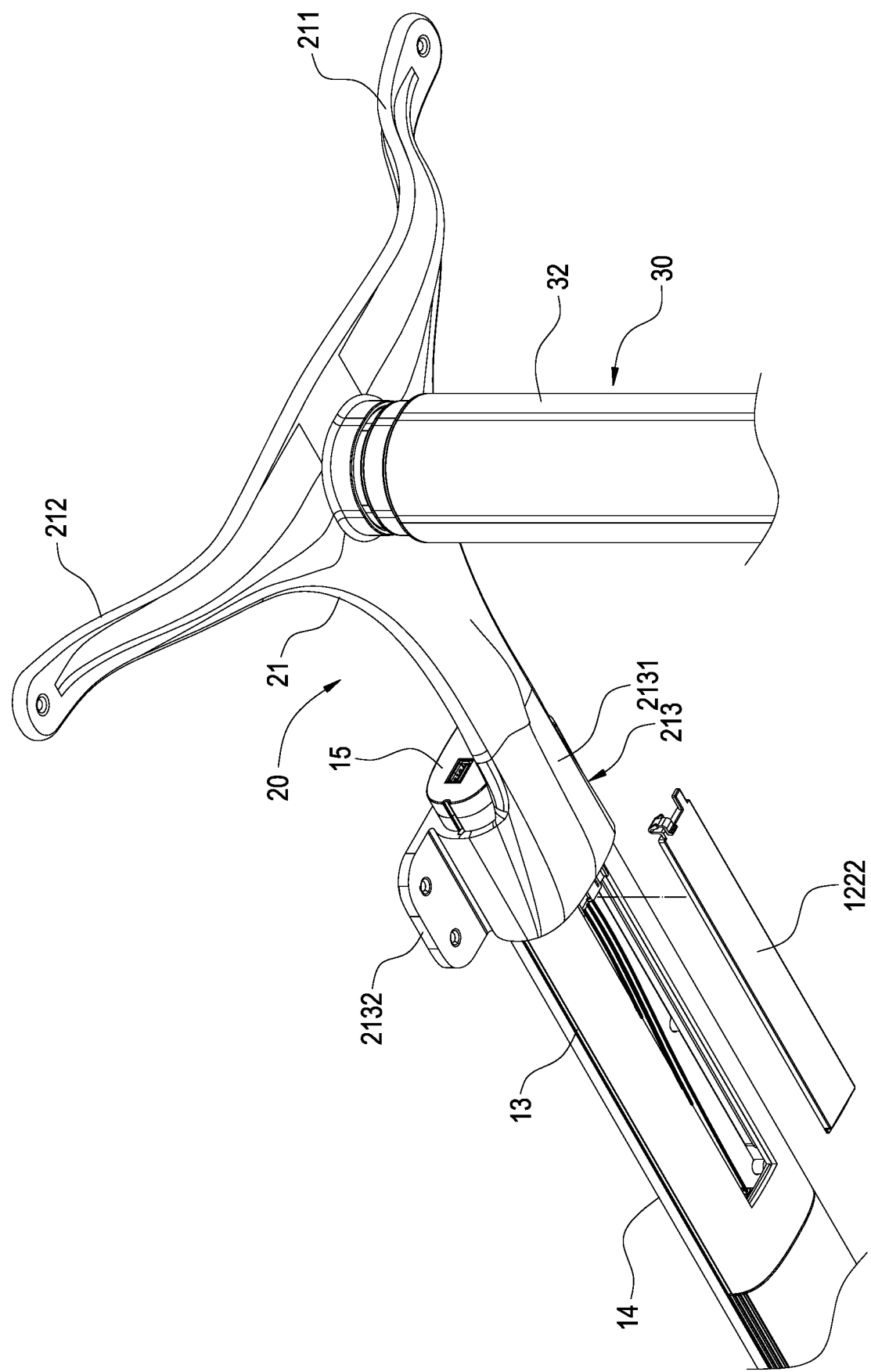
FIG. 14 is another schematic view showing the operating status of a part of the horizontal bar structure, the supporter and the vertical post structure according to the present invention.
Figure 15:
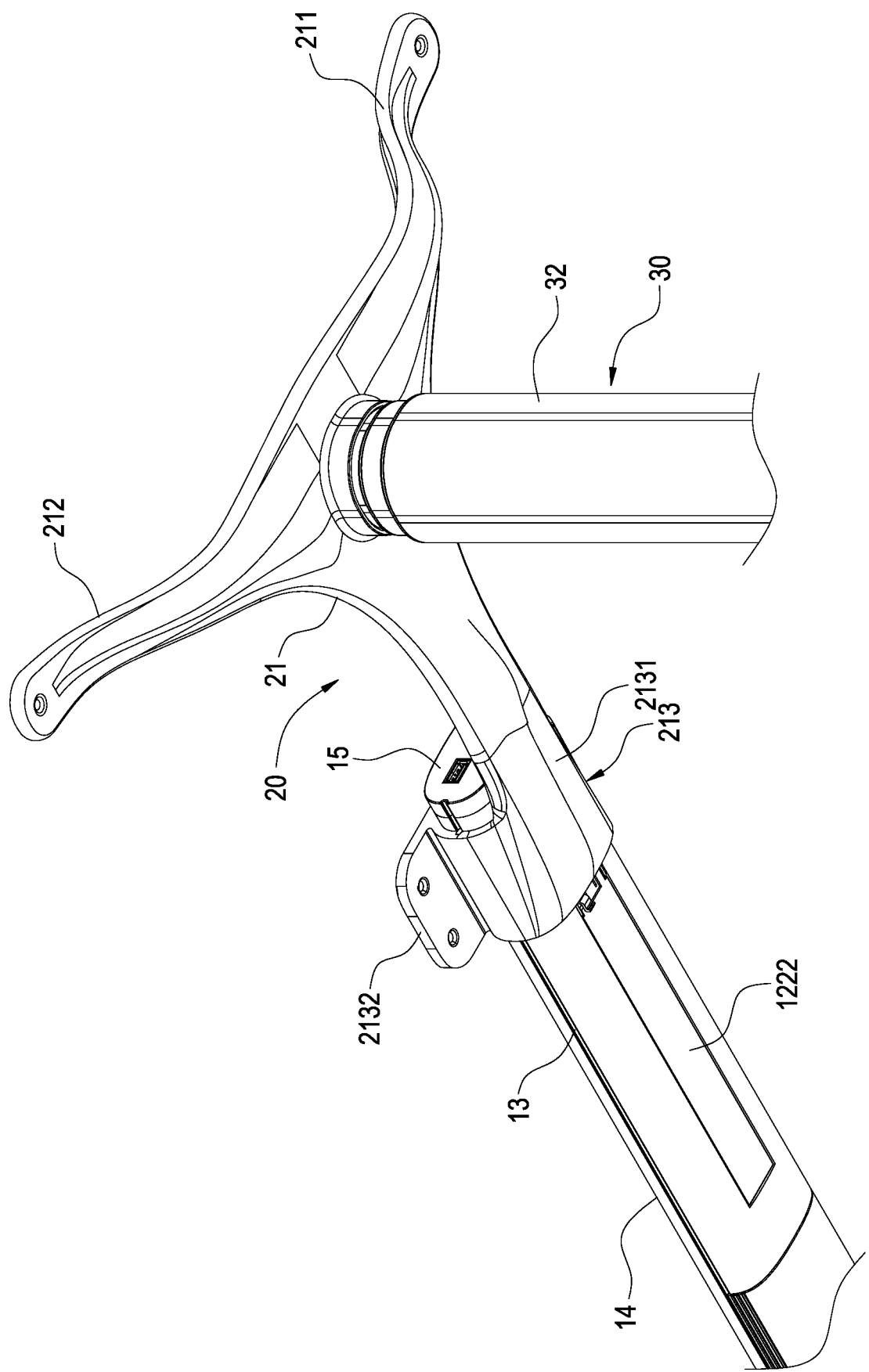
FIG. 15 is a schematic view showing the assembly of the cover plate of FIG. 14 being disposed at the bottom shell cover of the side bar segment.

Please refer from FIG. 13 to FIG. 15. When in use, each of the side bar segments 12 utilizes each of the guiding slots 13 to allow the convex strips 2133 to be mounted, the supporters 20 and the vertical post structures 30 can be adjusted according to actual needs of a user, so as to adjust relative locations of the supporters 20, the vertical post structures 30 and the horizontal bar structure 10; because the power and signal input connection port 491 and the power and signal input/output electrical terminal 467 are inserted for being connected, and the power and signal input/output electrical terminal 467 is able to displace relative to the bottom shell cover 122, during an adjusting displacement process, each of the power and signal input connection ports 491 and the power and signal input/output electrical terminal 467 or the power and signal input/output electrical terminal 485 are in a constant electrically-conducting status. Moreover, a cover plate 1222 is disposed on the bottom shell cover 122, so that a requirement of detecting or repairing each component therein can be satisfied.

Figure 16:
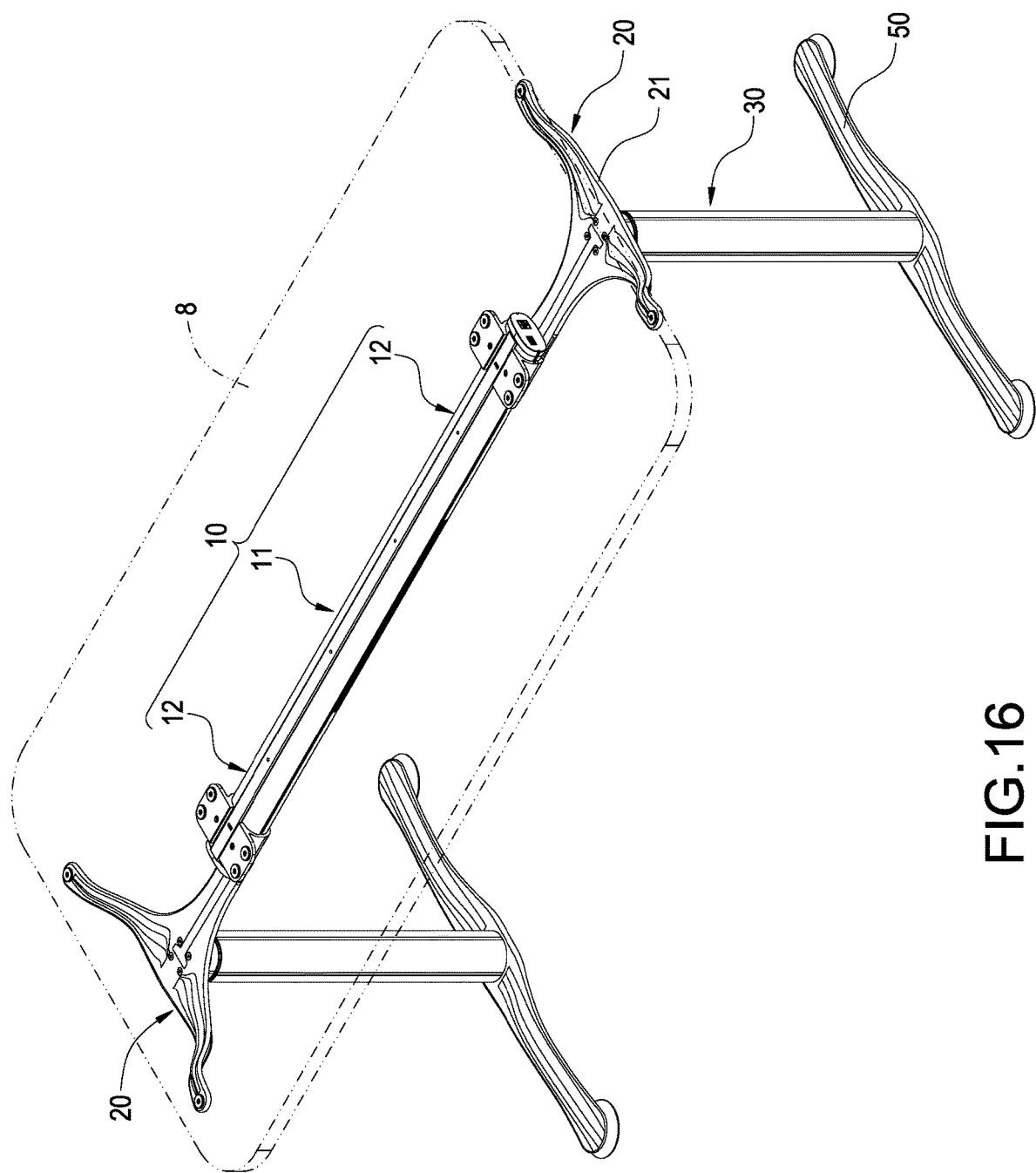
FIG. 16 is a schematic view showing the assembly of the power-driven table stand with combining mechanotronics being combined with a table plate according to the present invention.

Please refer to FIG. 16, which shows the power-driven table stand with combining mechanotronics of the present invention being combined with a table plate 8, wherein the table plate 8 can be placed on a carrying surface structured by the first arm member 211, the second arm member 212 and the third arm member 213 of each of the supporters 20, and fastening units, for example screws, can be used for passing each of the penetrated holes 2111, 2121, 2134 for being locked and fastened with the table plate 8.

Figure 17:
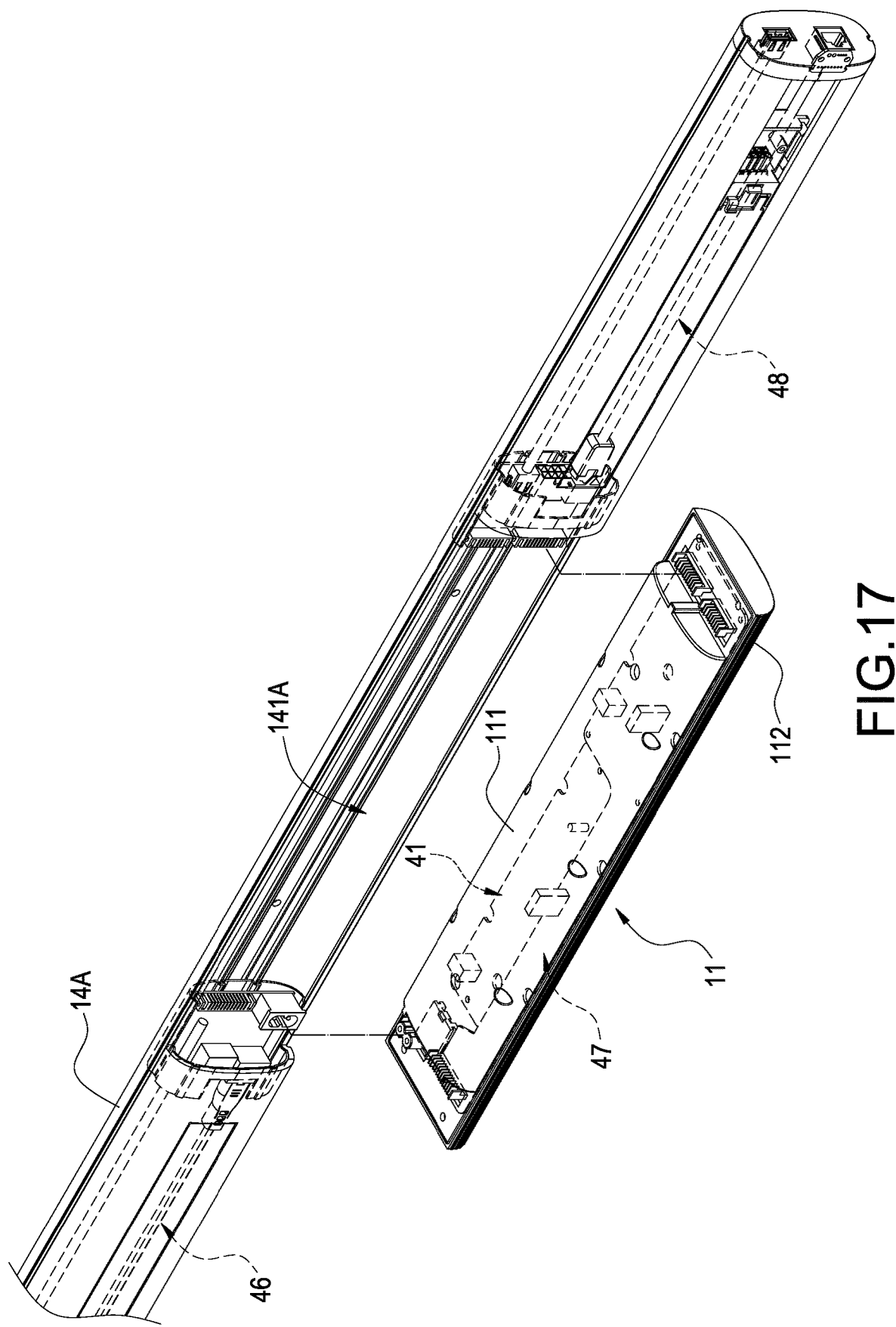
FIG. 17 is an exploded view showing the horizontal bar structure according to another embodiment of the present invention.

Please refer to FIG. 17. In addition to the above-mentioned embodiment, according to the present invention, another embodiment is provided as follows. An opening 141A is formed at a central portion of a sleeve pipe 14A, two sides of the sleeve pipe 14A allow the first guiding module 46 and the third guiding module 48 to be disposed, the controller 41 and the second guiding module 47 are disposed in the middle bar segment 11, the middle bar segment 11 is sleeved with the sleeve pipe 14A corresponding to a location of where the opening 141A is formed, so that the middle bar segment 11 can be individually detached when a detecting and repairing operation is desired, thereby increasing the convenience in assembling and maintaining.

Figure 18:
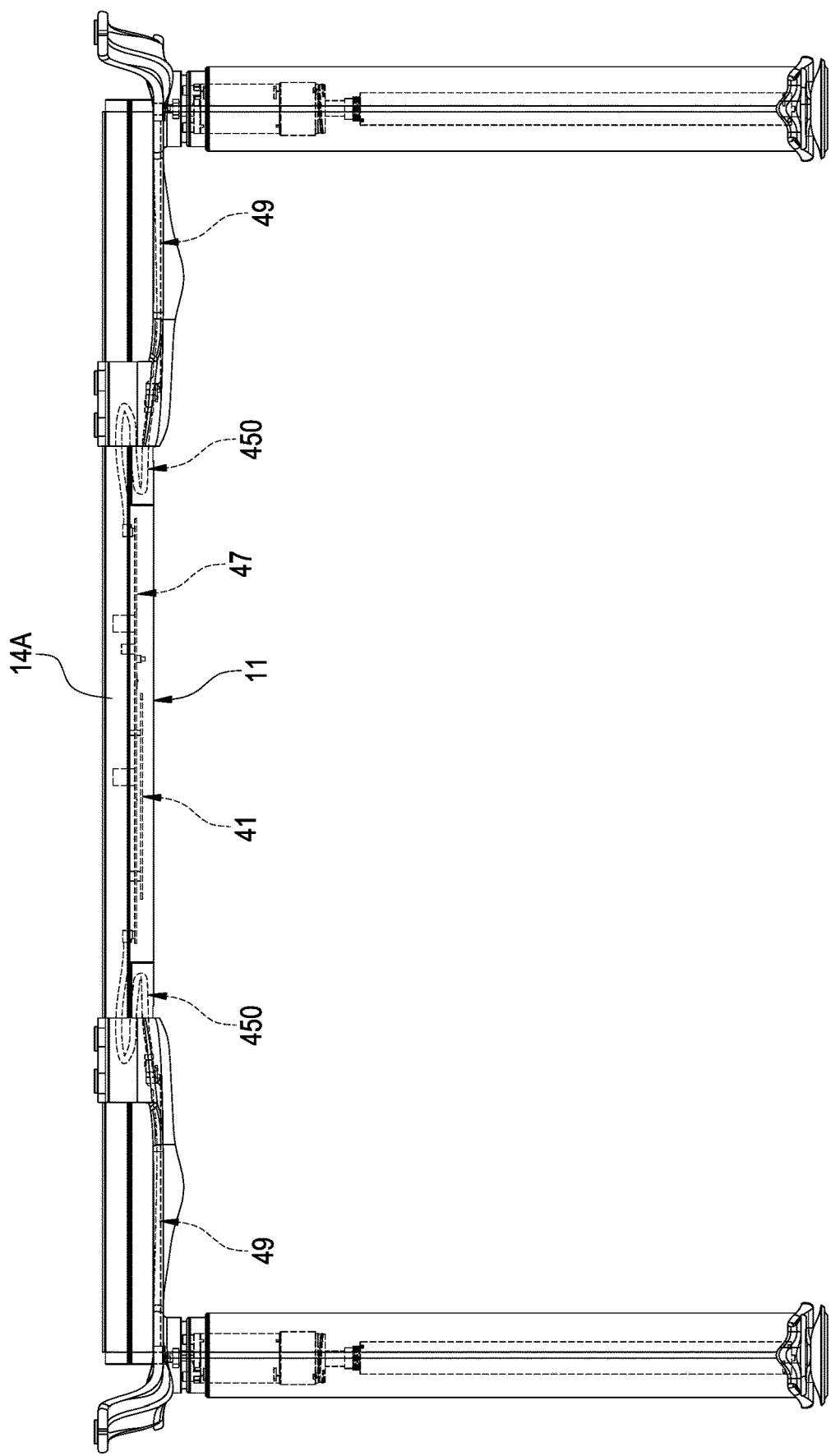
FIG. 18 is a front view showing the assembly according to the another embodiment of the present invention.

Please refer to FIG. 18. According to the another embodiment, a guiding wire 450 is utilized for replacing the first guiding module 46 and the third guiding module 48, two ends of the guiding wire 450 are electrically connected to the power and signal output connection port 473 of the second guiding module 47 and the power and signal input connection port 491 of the fourth guiding module 49, so that the cost of required materials can be greatly saved.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A power-driven table stand with combining mechanotronics, including:
   a horizontal bar structure (10);
   a pair of supporters (20), connected at two sides of the horizontal bar structure (10);

a pair of vertical post structures (30), each directly connected to one of the supporters (20) and having a motor (31) disposed inside; and an electrical device (40), having a controller (41) and a guide wiring (45), wherein the controller (41) is disposed on the horizontal bar structure (10), the guide wiring (45) is stored and hidden in the horizontal bar structure (10) and each of the supporters (20), and electrically connected to the controller (41) and the motor (31), wherein the horizontal bar structure (10) has a middle bar segment (11) and two side bar segments (12) connected at two sides of the middle bar segment (11); the guide wiring (45) has a first guiding module (46), a second guiding module (47) and a third guiding module (48), the first guiding module (46) is disposed at one of the side bar segments (12), the second guiding module (47) is disposed at the middle bar segment (11), and the third guiding module (48) is disposed at the other side bar segment (12).

2. The power-driven table stand with combining mechanotronics according to claim 1, wherein the middle bar segment (11) has a top shell cover (111) and a bottom shell cover (112) mutually assembled with the top shell cover (111), and two ends of the middle bar segment (11) have a combining part (113); each of the side bar segments (12) has a top shell cover (121) and a bottom shell cover (122) mutually assembled with the top shell cover (121), one end of each of the side bar segments (12) has a combining part (123), and the combining part (123) of each of the side bar segments (12) is combined with the combining part (113) of the middle bar segment (11).

3. The power-driven table stand with combining mechanotronics according to claim 2, wherein the first guiding module (46) has a circuit board (461), a power input electrical terminal (462), a power output electrical terminal (463), a power and single input connection port (464), a power and signal output connection port (465), a plurality of connection wires (466) and a power and signal input/output electrical terminal (467); the circuit board (461) is fastened in the side bar segment (12), the power input electrical terminal (462), the power output electrical terminal (463), the power and signal input connection port (464) and the power and signal output connection port (465) are fastened on the circuit board (461) and electrically connected with each other.

4. The power-driven table stand with combining mechanotronics according to claim 3, wherein the power input electrical terminal (462) is located at one end, defined being away from the middle bar segment (11), of the side bar segment (12), the power output electrical terminal (463) and the power and signal input connection port (464) are located at a location where the combining part (123) of the side bar segment (12) is disposed, and the power and signal input/output electrical terminal (465) is located close to one end where the power input electrical terminal (463) is disposed.

5. The power-driven table stand with combining mechanotronics according to claim 3, wherein the power and signal input/output electrical terminal (467) is moveably disposed on the bottom shell cover (122) of the side bar segment (12), and connected to the power and signal output connection port (465) via each of the connection wires (466).

6. The power-driven table stand with combining mechanotronics according to claim 2, wherein the second guiding module (47) has a circuit board (471), a power input electrical terminal (472), and two power and signal output connection ports (473); the circuit board (471) and the controller (41) are fastened in the middle bar segment (11), and the power input electrical terminal (472) and each of the power and signal output connection ports (473) are fastened on the circuit board (471) and electrically connected with each other.

7. The power-driven table stand with combining mechanotronics according to claim 6, wherein the power input electrical terminal (472) and one of the power and signal output connection ports (473) are disposed at a location where one of the combining parts (113) of the middle bar segment (11) is disposed, and the other power and signal output connection port (473) is disposed at a location where the other combining part (113) of the middle bar segment (11) is disposed.

8. The power-driven table stand with combining mechanotronics according to claim 7, wherein the first guiding module (46) has a power output electrical terminal (463) and a power and single input connection port (464), the power input electrical terminal (472) of the second guiding module (47) and the power output electrical terminal (463) of the first guiding module (46) are inserted for being connected, and one of the power and signal output connection ports (473) of the second guiding module (47) and the power and signal input connection port (464) of the first guiding module (46) are inserted for being connected.

9. The power-driven table stand with combining mechanotronics according to claim 2, wherein the third guiding module (48) has a circuit board (481), a power and single input connection port (482), a power and signal output connection port (483), a plurality of connection wires (484), and a power and signal input/output electrical terminal (485); the circuit board (481) is fastened in an internal space defined by the top shell cover (121) and the bottom shell cover (122) of the side bar segment (12), the power and signal input connection port (482) and the power and signal output connection port (483) are fastened on the circuit board (481) and electrically connected with each other.

10. The power-driven table stand with combining mechanotronics according to claim 9, wherein the power and signal input connection port (482) is located at a location where the combining part (123) of the side bar segment (12) is disposed, and the power and signal output connection port (483) is located close to an end where the power and signal input connection port (482) is disposed.

11. The power-driven table stand with combining mechanotronics according to claim 10, wherein the power and signal input/output electrical terminal (485) is moveably disposed on the bottom shell cover (122) of the side bar segment (12), and connected to the power and signal output connection port (483) via each of the connection wires (484).

12. The power-driven table stand with combining mechanotronics according to claim 11, wherein the third guiding module (48) further has a plurality of functional connection ports (486), and each of the functional connection ports (486) is fastened on the circuit board (481) and electrically connected with each other.

13. The power-driven table stand with combining mechanotronics according to claim 1, wherein the guide wiring (45) further has a fourth guiding module (49), the supporter (20) has a base seat (21), and the fourth guiding module (49) is disposed on the base seat (21).

14. The power-driven table stand with combining mechanotronics according to claim 13, wherein a wire receiving slot (214) is formed in the base seat (21), the wire receiving slot (214) allows the fourth guiding module (49) to be received, and a press plate (22) is utilized for pressing and fastening.

15. The power-driven table stand with combining mechanotronics according to claim 13, wherein the fourth guiding module (49) has a power and signal input connection port (491), a plurality of connection wires (492) and a power and signal output connection port (493); the power and signal input connection port (491) and the power and signal output connection port (493) are electrically connected via each of the connection wires (492).

16. The power-driven table stand with combining mechanotronics according to claim 1, wherein the horizontal bar structure (10) further has a sleeve pipe (14) sleeved at an outer side of the middle bar segment (11) and that of each of the side bar segments (12).

17. The power-driven table stand with combining mechanotronics according to claim 16, wherein the horizontal bar structure (10) further has a pair of end covers (15), and each of the end covers (15) covers at one end, defined being away from the middle bar segment (11), of each of the side bar segments (12) and mutually sleeved with the sleeve pipe (14).

18. The power-driven table stand with combining mechanotronics according to claim 1, wherein the horizontal bar structure (10) further has a pair of guide slots (13) formed at a lateral side of the middle bar segment (11) and that of each of the side bar segments (12), and the supporter (20) has a base seat (21), the base seat (21) has a supporting element (2131), a pair of convex strips (2133) are protruded from an inner wall surface of the supporting element (2131), and each of the convex strips (2133) is correspondingly mounted in each of the guiding slots (13).

19. The power-driven table stand with combining mechanotronics according to claim 2, wherein a set of guiding grooves (1221) are formed in the bottom shell cover (122) of the side bar segment (12), the first guiding module (46) has a power and signal input/output electrical terminal (467), a sliding seat (4671) is disposed at the power and signal input/output electrical terminal (467), and a plurality of convex columns (4672) are extended from the sliding seat (4671), each of the convex columns (4672) passes each of the guiding grooves (1221), so that the power and signal input/output electrical terminal (467) is able to displace relative to the bottom shell cover (122) of the side bar segment (12).

20. A power-driven table stand with combining mechanotronics, including:
   a horizontal bar structure (10);
   a pair of supporters (20), connected at two sides of the horizontal bar structure (10);
   a pair of vertical post structures (30), each directly connected to one of the supporters (20) and having a motor (31) disposed inside; and
   an electrical device (40), having a controller (41) and a guide wiring (45), wherein the controller (41) is disposed on the horizontal bar structure (10), the guide wiring (45) is stored and hidden in the horizontal bar structure (10) and each of the supporters (20), and electrically connected to the controller (41) and the motor (31),
   wherein each of the vertical post structures (30) further includes a plurality of retractable pipes (32) and an electrical terminal (33), the motor (31) is disposed in each of the retractable pipes (32), and the electrical terminal (33) is fastened on an end surface of each of the retractable pipes (32) and electrically connected to the motor (31).

21. A power-driven table stand with combining mechanotronics, including:
   a horizontal bar structure (10);
   a pair of supporters (20), connected at two sides of the horizontal bar structure (10);
   a pair of vertical post structures (30), each directly connected to one of the supporters (20) and having a motor (31) disposed inside; and
   an electrical device (40), having a controller (41) and a guide wiring (45), wherein the controller (41) is disposed on the horizontal bar structure (10), the guide wiring (45) is stored and hidden in the horizontal bar structure (10) and each of the supporters (20), and electrically connected to the controller (41) and the motor (31),
   wherein the guide wiring (45) has a first guiding module (46) and a second guiding module (47), the horizontal bar structure (10) has a middle bar segment (11) and a sleeve pipe (14A), an opening (141A) is formed at a central portion of a sleeve pipe (14A), the controller (41) and the second guiding module (47) are disposed in the middle bar segment (11), and the middle bar segment (11) is sleeved with the sleeve pipe (14A) corresponding to a location of where the opening (141A) is formed.

22. The power-driven table stand with combining mechanotronics according to claim 21, wherein the guide wiring (45) further has a guiding wire (450), a third guiding module (48) and a fourth guiding module (49), the supporter (20) has a base seat (21), the fourth guiding module (49) is disposed in the base seat (21), and two ends of the guiding wire (450) are electrically connected to the second guiding module (47) and the fourth guiding module (49).

23. The power-driven table stand with combining mechanotronics according to claim 20, wherein the guide wiring (45) has a first guiding module (46), a second guiding module (47) and a third guiding module (48), the horizontal bar structure (10) has a middle bar segment (11) and a sleeve pipe (14A), an opening (141A) is formed at a central portion of a sleeve pipe (14A), the controller (41) and the second guiding module (47) are disposed in the middle bar segment (11), the middle bar segment (11) is sleeved with the sleeve pipe (14A) corresponding to a location of where the opening (141A) is formed, and the first guiding module (46) and the third guiding module (48) are disposed at two sides defined inside of the sleeve pipe (14A).

* * * * *